United States Patent [19]
Perthuis et al.

[11] Patent Number: 5,547,926
[45] Date of Patent: * Aug. 20, 1996

[54] NEW COMPOSITIONS FOR IRON CONTROL IN ACID TREATMENTS FOR OIL WELLS

[75] Inventors: Hervé Perthuis, Saint Etienne, France; Jean-Pierre Feraud, Tulsa, Okla.; Philippe Dejeux, St Priest En Jarez; Pierre Maroy, Saint Galmier, both of France

[73] Assignee: Dowell, a division of Schlumberger Technology Corporation, Houston, Tex.

[*] Notice: The portion of the term of this patent subsequent to May 27, 2012, has been disclaimed.

[21] Appl. No.: 911,224

[22] Filed: Jul. 9, 1992

[30] Foreign Application Priority Data

Jul. 19, 1991 [FR] France ................................ 91 09323

[51] Int. Cl.⁶ .................................................... E21B 43/00
[52] U.S. Cl. ............................................ 507/258; 507/933
[58] Field of Search ........................ 252/8.553; 501/258, 501/933

[56] References Cited

U.S. PATENT DOCUMENTS 3,773,465  11/1973  Keeney et al. ........................ 21/2.7 R
4,661,266   4/1987  Kanda et al. ........................ 252/8.551

Primary Examiner—Gary Geist
Attorney, Agent, or Firm—John E. Vick, Jr.

[57] ABSTRACT

The invention relates to iron control in an acid medium for forestalling the formation of precipitates known as "sludges" (asphaltic products) in contact with certain crude oils.

Use is made of compounds comprising a mercaptan function non miscible in water and, in combination, a selection of catalysts.

Application to acid treatments for oil, gas, water, geothermal and analogous wells, as well as to industrial cleaning.

7 Claims, No Drawings

NEW COMPOSITIONS FOR IRON CONTROL IN ACID TREATMENTS FOR OIL WELLS

The present invention relates to the technical field of acid treatments designed to stimulate the production of oil, gas, water, geothermal and analogous wells, as well as to that of industrial cleaning.

The objectives and techniques of acid well treatment are very familiar to a man of the art and it is quite unnecessary to reiterate them here. It will simply be recalled that the acid fluids pumped into the well and into the adjacent formations are of a very special nature in that they are of extremely high acidity.

Acid treatments are accompanied by very familiar problems linked with the presence of iron in the acid that is pumped into the formations, essentially as a result of the acid dissolving the rust in the casings during pumping, and possibly the dissolving of minerals in the iron containing formation.

The presence of iron (III) in the acid injected causes, in contact with certain crude oils, the precipitation of the asphaltic products contained in the oil in the form of deposits of a vitreous aspect known as "sludges" which leads to practically irreversible damage to the zone treated; the scale of precipitation generally increases with the strength and concentration of the acid.

The dispersibility of customary additives, such as surfactants, is also affected by the presence of iron (III) through the formation of complexes.

When the acid injected is consumed by the dissolution of the minerals of the formation, the presence of iron (III) leads to the precipitation of a colloidal precipitate of ferric hydroxide which damages the formation.

In the particular case of wells containing hydrogen sulphide, the ferric hydroxide precipitate does not occur as a reducing medium is involved, but other damaging precipitations, such as that of colloidal sulphur, can also occur in the absence of iron control agents.

The use of iron control additives is thus necessary in most acid treatments, with a view to removing the majority of the free iron (III) in the treatment acid.

The conventional complexing agents of the soluble forms of iron, such as the aminopolycarboxylic acid derivatives, citric acid, acetic acid or salicylic acid only lead to the formation of stable complexes in a medium that is not very acid, and can only serve, therefore, to mask the iron in the spent acid, and they are ineffectual in preventing the formation of sludges induced by contact with certain crude oils and the pumped acid that still has a concentration close to initial concentration.

As a variant, liquid-liquid extraction of iron (III) in the organic phase, in processes including the injection of suitable solvents, has also been proposed after complexing with certain of these complexing products, but the efficiency of the process is only proven in a spent acid medium and is limited to low dissolved iron (III) contents.

The usual reducing agents for iron (III) are also generally more efficient in partially spent acids than in acids that have not reacted; in a highly acid medium, we often observe reduction kinetics that are too slow for thermodynamically possible reactions to enable sludge formation to be efficiently prevented under acid treatment conditions. Furthermore, the chemical and/or thermal stability of the reducing agents considerably limits their use in a very acid medium. Thus, sulphur base mineral reducing agents (sulphites, hydrosulphites, etc.) are unstable in an acid medium.

Organic reducers are often limited by the kinetics of their reactions, and by their limited chemical stability in a highly acid medium and in terms of temperature. Thus, the erythorbic or ascorbic acid, frequently used in acid treatments, can forestall the precipitation of ferric hydroxide in the spent acid, but they can sometimes present serious shortcomings as regards quickly reducing the iron in a highly acid medium, and thus forestalling sludge formation.

Similarly, the nitrogen or phosphorus base reducing systems have slow reduction kinetics in an acid medium. The use of oxidation reduction catalysts can permit a considerable acceleration of the reduction kinetics; the process is well known, for example, in the field of nickel plating, in which metallic salts are added to baths of hypophosphorous acid. The catalysing electrochemical couple must possess fast kinetics and an intermediate potential between those of Fe (III) /Fe (II) and of the reducing system selected.

Decisive progress has been made by using the fluids and processes disclosed in French patent application Ser. No. 91 06774.

According to this patent application, the use of mercaptans soluble in an aqueous medium, in combination with a selection of catalytic systems, leads to extremely efficient control of Fe (III), even in a very highly acid medium.

The present invention represents an improvement in relation to the teachings of the aforementioned application in the control of precipitations due to iron in the acid treatments and of the incompatibilities observed simultaneously. It comprises the use of a selected catalytic system combined with that of a selection of reducing products with the aim of removing the ferric ions of the acid solution practically instantaneously during pumping, thus avoiding the formation of sludges in contact with certain crude oils owing to the presence of iron (III) in the acid, opening up, moreover, new applications, some of which will be mentioned hereinafter, and the poor dispersibility of certain additives of acid solutions, as well as the subsequent formation of mineral precipitates in the course of neutralization of the acid following its coming into contact with the minerals.

It has been discovered, according to the invention, that mercaptans non miscible in water, in combination with a selected catalytic system, made it possible to achieve the above objectives with a very high degree of efficiency combined with advantages of a financial order.

It is also surprising to note that, although the acid fluid pumped is an aqueous fluid, products non miscible in water are very efficient.

These results are essentially linked to the far faster reduction of far larger quantities of Fe (3+) by comparison with the prior art.

The advantages of the mercaptan function used for iron control in an extremely acid medium, and most especially in an acid medium containing HCl, in the petroleum and related fields, as well as in industrial cleaning, are numerous and form a group of properties never before achieved in this industry.

These properties will be quite especially appreciated in the acid treatment of oil and analogous wells where, in particular, the precipitation of "sludges" (precipitation of asphaltic products) has been of serious concern to operators for very many years.

On one hand, the reaction is quantitative. The compositions according to the invention are thus efficient up to Fe (3+) concentrations that were found absolutely impossible to treat hitherto.

Thus, certain prior art techniques can act more or less efficiently upon Fe (3+) concentrations not exceeding approximately 15 000 ppm in an acid medium. On the other hand, in an aqueous solution of 15% hydrochloric acid, the compositions according to the invention efficiently control Fe (3+) up to concentrations in the order of 50 g/l, or 50 000 ppm. This leads, among other advantages (notably the absence of "sludges"), to that of being able, in acid treatment operations, to dispense with the prior, extremely costly stage of well cleaning.

Indeed, controlling such concentrations means that even Fe (3+) from rust deposits, etc. will be controlled efficiently, for the first time.

Secondly, the compositions according to the invention remain efficient even in the presence of $H_2S$ (no sulphur precipitate).

They further have the advantage of being extremely stable in the highly acid medium under consideration, even under hot conditions, which is also an important parameter for operators in the field.

The mercaptan function is, of course, known for its reducing properties, but only in a basic medium, as well as in a very slightly acid or neutral medium, and in a completely different application, the object being to oxidize the SH groups in order to remove them.

In a highly acid medium (above an acidity corresponding to 3–4% HCl), there was, on the contrary, every reason to anticipate a risk of sulphur precipitation (clearly unacceptable in the treatment of a well owing to the risk of irreparable damage to the reservoir by the precipitate).

It will be noted that the technology according to the invention is quite particularly useful in the presence of $H^+$ and $Cl^-$ ions (i.e. notably in the presence of hydrochloric acid in the acid fluid used in treatment) as this combination of $H^+$ and $Cl^-$ ions is the main cause of the great difficulty experienced in the reduction of Fe (3+).

Another essential aspect of the invention, apart from the mercaptan function, relates to the choice of the catalysts of the reaction reducing Fe 3+ to Fe 2+.

Numerous catalysts of such reactions are known in the literature.

The tests conducted on the products used according to the invention, presenting a mercaptan function, have nonetheless shown, contrary to what is observed for the reactions known in the prior art, that:

a) the choice of catalyst or of the catalytic system is a function of the acidity of the pumped acid fluid; and that:

b) only copper or copper combined with iodine are suitable.

It is quite surprising to find that other known catalysts, such as Ni, Mn, Ce, Zn, Co, Sn, V, Cr, Ti, etc. are ineffectual (although not notably affecting the reaction).

Thus, for a 5% acid, the catalyst can be copper. Iodine alone is not suitable.

This is still true for a 15% acid.

On the other hand, in the case of a 28% acid, copper alone or iodine alone are ineffectual; only the combination of iodine and copper gives a suitable result.

This copper + iodine combination is also clearly more efficient (as regards the kinetics of the reaction) in the case of less concentrated acids. In marked preference, according to the invention, the copper + iodine combination will thus be selected over the entire range of acidity.

According to one of its aspects, the invention thus relates to new compositions for iron control and sludge prevention in the petroleum and related fields, as well as to applications in industrial cleaning, characterized in that they contain at least one compound having a mercaptan function non miscible in water and a catalytic quantity of copper or, preferably, of copper combined with iodine.

In the present application, the term "copper" designates cuprous or cupric ions, and "iodine" designates iodine or iodide ions; as well, of course, as any compound generating in situ the chemical entities defined hereabove.

The compounds under consideration being reducing agents reacting mole by mole with the ferric iron, a minimum concentration corresponding the stoichiometry is necessary. It is desirable, however, to increase the reducing agent concentration to accelerate the reduction kinetics of the Fe 3+. Conversely, in certain cases, there may be reason not to seek to reduce the iron (III) in its totality.

In the case of propane-1-thiol, for example, the reducing agent concentrations will vary typically from 0 to 90 $kg/m^3$ to control from 0 to 30 000 ppm of iron (III) in acid treatment (15% HCl).

As regards catalytic systems, the concentrations required for a reduction of iron (III) in less than 2 minutes after mixing will vary, for example, from 0 to 2.6 $kg/m^3$ of dihydrate cupric chloride and from 0 to 1.7 $kg/m^3$ of potassium iodide to control respectively from 0 to 30 000 ppm of iron (III) in the different treatment acids.

A man of the art will appreciate that the quantities of reducing agent (s) and catalyst (s) can be higher than those recommended hereabove, in order, possibly, to adjust to best advantage the reactional parameters to the treatment contemplated. It will also be clear that there is a natural economic limit that a man of the art will be in a position to appreciate.

The reducing agents used according to the invention correspond to the following formula:

where R represents an aliphatic group, preferably alkyl, preferably $C_1$–$C_4$;

a —$CH_2$—Z group, wherein Z can be an aromatic group, the methylene group being possibly substitutable, by a substitution not affecting the function of the mercaptan group;

an aromatic cycle, possibly having a hydrophilic function on another carbon in the cycle; as well as their alkali metal salts, notably Na and K.

According to the invention, use will also be made preferably of an emulsifying agent known to the man of the art, functioning in an acid medium to disperse the reducing agent in an aqueous medium when this appears necessary. When the reducing agent belongs to the family of alkanethiols, this necessity will become apparent, for example, as from ethanethiol.

These emulsifying agents will be preferably cationic or non ionic, and added in an acid medium to a concentration of approximately 0 to 2% by volume.

As to reducing agents, preference will be given to alkanethiols, preferably with short $C_1$ to $C_4$ chains, such as methanethiol or ethanethiol, and their sodium salts.

The following examples illustrate the invention without, however, limiting the scope thereof.

Representative examples of the reducing agents with a mercaptan function that can be used according to the invention are indicated in Tables I and II hereinafter.

A man of the art will easily be able to envisage the technical equivalents of the above compounds, which also form part of the invention.

It will also be obvious, for example, that increasing the carbon condensation of the products under consideration, or envisaging more complicated technical equivalents, does not present any advantages and, on the contrary, leads to higher costs. There is thus a natural limit to the products that can be used in practice.

in order to obtain the results of Tables I and II, we tested the efficiency of the reducing agent/catalyst pairs according to the invention with regard to the reduction of Fe 3+ to Fe 2+ in a very to extremely acid medium.

The criterion adopted was the quantity of Fe(3+) reduced in two minutes, for a reducing agent concentration of $3.10^{-3}$ mole in 10 ml of acid solution.

Table I gives the results obtained under these conditions, without an emulsifier, while, in Table II, an emulsifier has been added.

The values in [ ] show that the catalytic system is $CuCl_2$, the quantity being expressed in millimole.

The values in { } show that the catalytic system is a combination of $CuCl_2$ and KI, the quantities also being expressed in millimole.

Table III groups together, according to the same principles, the results obtained, for the same reducing agent, with different catalytic systems.

In Table III, the emulsifying agent is of a cat ionic type.

In Tables I, II and III:

E1 designates a non-ionic emulsifier

E2 designates a cationic emulsifier

E3 designates a cationic emulsifier

E4 designates a non-ionic emulsifier

E5 designates a cationic emulsifier

TABLE I

| REDUCING AGENT (3 mmoles) | Temp. (°C.) | ACID MEDIUM AND QUANTITY OF FE (III) REDUCED (MMOLES) | | | | |
|---|---|---|---|---|---|---|
| | | HCl 5% | HCl 15% | HCl 28% E4 1% | RMA 12/5 + E2 3% | RMA 4/0.5 + E2 1% |
| METHANETHIOL Na salt $CH_3SNa$ | 20 | 2.9 [0.025] | 2.5 [0.1] | 0.3 {0.1 + 0.05} | 2.5 [0.05] | 1 [0.025] |
| | 90 | 2.1 {0.08 + 0.03} | 1.5 {0.1 + 0.05} | 0.8 {0.15 + 0.08} | | |
| ETHANETHIOL $CH_3CH_2SH$ | 20 | 0.9 [0.06] | 1.8 [0.05] | 0.9 {0.12 + 0.06} | 0.7 [0.04] | 2.1 [0.04] |
| | 90 | 2.1 {0.08 + 0.05} | 1.7 {0.1 + 0.05} | 1.2 {0.15 + 0.08} | | |
| PROPANE-1-THIOL $CH_3CH_2CH_2SH$ | 20 | 0.5 [0.06]* | 1.5–1.8 [0.04] | | 2 [0.06] | 2 [0.02] |
| | 90 | 0.3 [0.02] | 0.1–0.7 [0.05] | | | |
| ISOPROPYL- MERCAPTAN $(CH_3)_2CHSH$ propane-2-thiol | 20 | 1.1 [0.08] | 1.8 [0.08] | 0.5 {0.15 + 0.07} | 1.4 [0.08] | 1.8 [0.04] |
| | 90 | | | | | |
| t- BUTYLMERCAPTAN $(CH_3)_3CSH$ | 20 | 0.1 [0.05] | 0.1 [0.05] | | 1.6 [0.04] | 1.8 [0.04] |
| | 90 | 0.1 [0.05] | 0.1 [0.05] | | | |
| ALLYLMERCAPTAN $CH_2=CH-CH_2-SH$ | 20 | | | | | |
| | 90 | | | | | |
| THIOPHENOL $C_6H_5SH$ | 20 | 0.3 [0.02] | 0.45 [0.05] | | | |
| | 90 | 2.8 [0] | 1.1 [0.05] | | | |
| BENZYLMERCAPTAN $C_6H_5CH_2SH$ | 20 | 0.1 [0.02] | 1 [0.05] | | | |
| | 90 | 1 [0.04] | 1 [0.05] | | | |
| p-HYDROXY THIOPHENOL $HO-C_6H_4-SH$ | 20 | 2.8 [0.02] | 0.1 [0.02] | | | |
| | 90 | 1.7 [0] 2.8 [0.02] | 2.9 [0.05] | | | |
| 4-THIOCRESOL $SH-C_6H_4-CH_3$ | 20 | 0.1 [0.02] | 0.1 [0.02] | | | |
| | 90 | 2.5 [0.02] | 0.45 [0.02] | | | |
| THIOSALICYLIC ACID $HOOC-C_6H_4-SH$ | 20 | 0.2 [0.02] | 0.1 [0.05] | | | |
| | 90 | 0.9 [0.02] | 2.6 [0.05] | | | |

RMA = Regular Mud Acid
HCl + HF 12%/3% and resp. 4%/0.5%
*2.7 in the presence of 2% E2

TABLE II

| REDUCING AGENT (3 mmoles) | Temp (°C.) | ACID MEDIUM AND QUANTITY OF FE (III) REDUCED (MMOLES) IN THE PRESENCE OF DEMULSIFIERS | | | | | | |
|---|---|---|---|---|---|---|---|---|
| | | HCl 5% + E1 0.5% | HCl 15% + E2 0.5% | HCl 15% E2 1% | HCL 15% + E2 2% | HCl 15% + E3 1% | HCL 15% + E4 1% | HCl 15% + E5 1% |
| METHANETHIOL Na salt $CH_3SNa$ | 20 | | | 2.4 [0.1] | | | | |
| | 90 | | | | | | | |
| ETHANETHIOL $CH_3CH_2Si$ | 20 | | | 1.6 [0.05] | | 1.3 [0.05] | | |
| | 90 | | | | | | | |
| PROPANE-1-THIOL $CH_3CH_2CH_2SH$ | 20 | 0.2 [0.02] | 2.1 [0.03] | 2.1 [0.03] | 2.5 [0.04] | 2 [0.03] | 1.1 [0.03] | 0.8 [0.03] |
| | 90 | 0.3 [0.02] | 0.7 [0.03] | 0.7 [0.03] | 0.9 [0.04] | | | |
| ISOPROPYL-MERCAPTAN $(CH_3)_2CHSH$ propane-2-thiol | 20 | | | 2 [0.05] | | 1.8 [0.06] | | |
| | 90 | | | 2.2 {0.1 + 0.1} | | | | |
| t-BUTYLMERCAPTAN $(CH_3)_3CSH$ | 20 | 0.1 [0.05] | 1.8 [0.06] | 1.8 [0.06] | 1.4 [0.04] | 1.9 [0.08] | 1.4 [0.12] | 1.2 [0.01] |
| | 90 | 0.1 [0.05] | 0.3 [0.08] | 0.3 [0.08] | 0.4 [0.04] | | | |
| ALLYLMERCAPTAN $CH_2=CH-CH_2-SH$ | 20 | | | 2.4 [0.1] 2.3 {0.1 + 0.05} | | | | |
| | 90 | | | 2.5 {0.15 + 0.05} | | | | |
| THIOPHENOL $C_6H_5SH$ | 20 | 0.3 [0.02] | | | 2.95 [0.02] | | | |
| | 90 | 2.8 [0] | | | 2.7 [0.08] | | | |
| BENZYLMERCAPTAN $C_6H_5CH_2SH$ | 20 | 0.1 [0.02] | | | 2.95 [0.04] | | | |
| | 90 | 1.8 [0.04] | | | 1.3 [0.08] | | | |
| p-HYDROXY THIOPHENOL $HO-C_6H_4-SH$ | 20 | 2.9 [0.02] | | | 2.1 | | | |
| | 90 | 2.8 [0.02] | | | 2.9 | | | |
| 4-THIOCRESOL $SH-C_6H_4-CH_3$ | 20 | 0.1 [0.02] | | | 2 [0.04] | | | |
| | 90 | 2.9 [0.02] | | | 2.3 [0.04] | | | |
| THIOSALI-CYLIC ACID $HOOC-C_6H_4-SH$ | 20 | 0.7 [0.02] | | | 1.1 [0.06] | | | |
| | 90 | 2.8 [0.02] | | | 2.3 [0.04] | | | |

TABLE III

TESTS WITH DIFFERENT CATALYTIC SYSTEMS AT 90° C. IN A 15% HCl MEDIUM

| REDUCING AGENT (3 mmoles) | CATALYTIC SYSTEM | | |
|---|---|---|---|
| | $CuCl_2$ | KI | $CuCl_2$ + KI |
| METHANETHIOL Na salt | E2 = 0 1.1 [0.1] | — | E2 = 0 1.5 {0.1 + 0.05} |
| ETHANETHIOL $CH_3CH_2SH$ | E2 = 0 0.5 [0.1] | E2 = 0 0.3 [0.1] | E2 = 0 1.7 {0.1 + 0.05} |
| PROPANE-1-THIOL $CH_3CH_2CH_2SH$ | E2 = 1% 1.7 [0.05] | E2 = 1% 1 [0.1] | E2 = 1% 2.1 {0.2 + 0.05} |
| ISOPROPYLMERCAPTAN $(CH_3)_2CHSH$ propane-2-thiol | E2 = 1% 0.1 [0.1] | E2 = 1% 0.4 [0.1] | E2 = 1% 2.2 {0.1 + 0.1} |

TABLE III-continued

TESTS WITH DIFFERENT CATALYTIC SYSTEMS AT 90° C.
IN A 15% HCl MEDIUM

| REDUCING AGENT | CATALYTIC SYSTEM | | |
|---|---|---|---|
| (3 mmoles) | $CuCl_2$ | KI | $CuCl_2$ + KI |
| t-BUTYLMERCAPTAN | E2 = 1% | E2 = 1% | E2 = 1% |
| $(CH_3)_3CSH$ | 0.4 | 0.3 | 1.5 |
|  | [0.1] | [0.1] | {0.15 + 0.1} |
| ALLYLMERCAPTAN | E2 = 1% |  | E2 = 1% |
| $CH_2=CH-CH_2-SH$ | 1 |  | 2.5 |
|  | [0.1] |  | {0.15 + 0.05} |

We claim:

1. An acidic fluid for treatment of a well penetrating a subterranean formation including an iron control agent comprising:

(a) a reducing agent having the formula:

H—S—R wherein R is selected from a group consisting of an aliphatic group, an aromatic group and a

—$CH_2$—Z group wherein Z is an aromatic group; and (b) a reduction catalyst selected from a group consisting of copper, cupric ion, cuprous ion, iodine and combinations thereof.

2. The fluid as set forth in claim 1, wherein the reducing agent is selected from a group consisting of:
   - methanethiol [(and its Na salt)],
   - ethanethiol [(and its Na salt)],
   - propane-1-thiol [(and its NA salt)],
   - propane-2-thiol [(and its Na salt)], or
   - t-butylmercaptan.

3. The fluid as set forth in claim 1 wherein the reducing agent is:
   - allylmercaptan,
   - thiophenol,
   - benzylmercaptan,
   - p-hydroxythiophenol,
   - 4-thiocresol, or
   - thiosalicylic acid.

4. The fluid as set forth in claim 1 including an effective amount of said reducing agent as is necessary for the reduction of $Fe^{3+}$ ion dissolved in said fluid.

5. The fluid as set forth in claim 1 further including hydrochloric acid.

6. The fluid as set forth in claim 1 including about 3 to about 28 percent acid.

7. A process for removing rust deposits from a well comprising the steps of circulating a fluid in accordance with claim 1 through the well.

* * * * *